ELECTRONIC SWITCH WITH COMPARATOR

Filed Oct. 29, 1959

Inventor
William E. Sollecito
by Charles W. Helzer
His Attorney 2,985,775
Patented May 23, 1961

2,985,775

ELECTRONIC SWITCH WITH COMPARATOR

William E. Sollecito, Schenectady, N.Y., assignor to General Electric Company, a corporation of New York Filed Oct. 29, 1959, Ser. No. 849,594

9 Claims. (Cl. 307—88.5)

The present invention relates to an electronic switch. More particularly, the invention relates to a new and improved electronic switch for effectively switching a signal source in and out of electric circuit relationship at a relatively fast rate.

There are many applications for fast switching devices in the electronic industry wherein it is desired to switch a source of electric signals in and out of circuit relationship at a relatively fast rate without introducing extraneous transients into the signal as a result of the switching action. In the case of mechanical switching devices the fast rate of switching required causes wear and tear of the switch contacts, and results in frequent replacements as well as producing undesired switching transients and noise impressed on the signal being switched. Hence, mechanical switching devices are generally unsatisfactory where relatively fast switching rates are concerned. While there are available in the art certain electronically operable switching devices that can be switched at a relatively rapid rate, the known devices of this nature are of such specialized design that their use is restricted to only certain narrow applications or they possess some undesired characteristic such as impressing switching transients on the signal being switched.

It is therefore a primary object of the present invention to provide a new and improved electronically operable switch capable of use in the wide number of applications.

Another object of the invention is to provide a new and improved electronic switch of the above types which is capable of switching at relatively fast rates, and which does not introduce unwanted extraneous switching transients into the signal being switched.

A still further object of the invention is to provide an electronic switch having the above set forth characteristics which is comparatively simple in construction and inexpensive to manufacture.

In practicing the invention an electronic switch is provided for switching a source of information signals on and off with respect to an output circuit. This new and improved electronic switch includes a comparator wave shaping circuit for shaping the wave form of an applied electric switching signal. A first summing device having a pair of input terminals is provided with one of the input terminals connected to the output of the comparator and a second input terminal connected to a source of signals to be switched. A gating device is coupled to the output of the first summing device, and a second summing device is provided which has one input terminal connected to the output of the gating device and a second input terminal coupled to the output of the comparator. An inverting device is connected intermediate one of the input terminals of the second summing device and the output of the comparator.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 1:
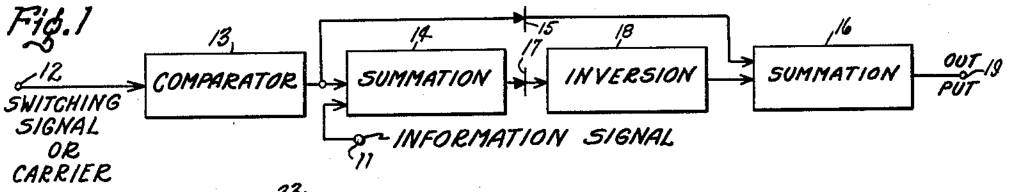
Figure 1 is a functional block diagram of a new and improved electronic switch constructed in accordance with the teachings of the present invention.

As shown in Figure 1 of the drawings, a new and improved electronic switch constructed in accordance with the invention is designed to switch an information signal applied to an input terminal 11 in and out of electric circuit relationship by means of a switching signal applied to the input terminal 12. The electronic switch includes a comparator wave shaping circuit 13 having a switching signal applied thereto from input terminal 12. The comparator 13 serves to shape the switching signal to give it a square wave form. It can be appreciated therefore that in the event that the switching signal $e_c$ has a square wave form, then the comparator 13 may be eliminated. The output of comparator 13 is connected to one input terminal of a first summation device 14 which has a second input terminal connected to the information signal source 11. The output of comparator 13 is also coupled through a coupling diode 15 to one input terminal of a second summation device 16. The output of the first summation device 14 is coupled through a gating device indicated by a diode 17 to the input of an inverting device 18 whose output is connected to the remaining input terminal of the second summation device 16. The output signal derived from the switching circuit is then supplied through an output terminal 19 to the circuit to which the information signal source 11 is to be switched in and out of circuit relationship at a rapid rate.

From a cursory examination of the functional block diagram of Figure 1 of the drawings, it can be appreciated that the switching signal applied to the input terminal 12 and supplied to the comparator 13 can take substantially two separate paths. One path is formed by the summation circuit 14, gating device 17 and inversion device 18. The second path includes the diode 15 and the remaining input to the summation device 16. It can be appreciated therefore that the switching signal components supplied to the input of the second summation circuit 16 are 180° out of phase so that substantial cancellation of the switching signal is accomplished in the second summation device 16. Hence no switching signal component will be supplied through the output terminal 19 to the circuit being switched in and out of circuit relationship with the information signal source 11. With regard to the information signal source 11 no such cancellation takes place since there is only a single signal path supplied through the first summation device 14 and gating device 17 and inverting device 18 to the input of the second summation circuit 16. By properly proportioning the input and feedback impedances, and other parameters of the summation devices, and the inverting device 18, it is possible to obtain any desired value of gain through the switching circuit. It is of course possible to supply the information signal from the source 11 to the output terminal 19 with substantially no gain at all so that it is in effect not altered in nature by the switching operation. Accordingly the circuit provides an all electric switching circuit which parallels the operation of electromechanical switching devices, and yet requires no moving parts. Consequently there is no wear or burn of moving contacts, and further, it is inherently capable of much higher speeds of operation. The circuit accomplishes these objectives, and yet is simple to manufacture, and can be fabricated from commercially available circuit components. By simple modifications to the circuit as will be described hereinafter, it is possible to obtain higher frequency operation with the switching circuit, without in any manner increasing its complexity or cost. It is anticipated that switching circuit of this type can find wide application in the computer field for the switching in and out of circuit relationship, different portions of the computer carrying out separate computation processes. However, it is to be understood that the circuit is not limited to this application but may find use in the instrumentation field, and other applications where programming at a high frequency is required.

Figure 2:
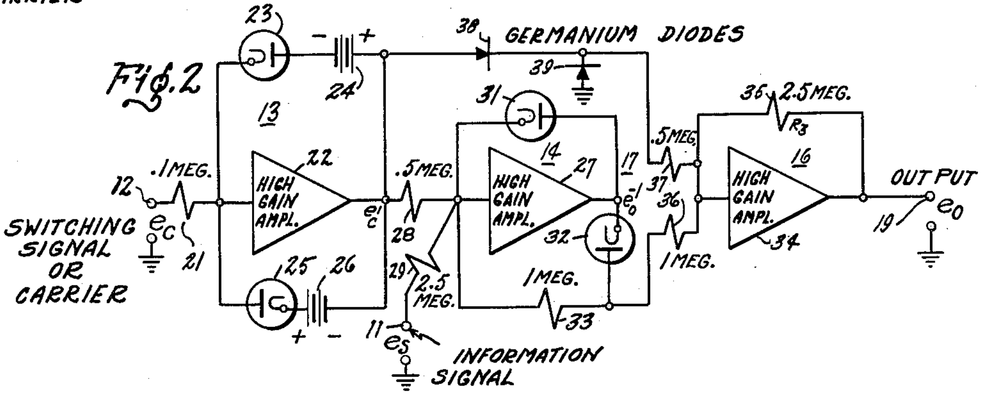
Figure 2 is a schematic circuit diagram of one form of an electronic switch constructed in accordance with the teachings of the present invention.

One practical embodiment of an electronic switch constructed in accordance with the invention is shown in Figure 2 of the drawings. In the Figure 2 embodiment of the invention, the switching signal applied to the input terminal 12 is applied across a 1 megohm resistor 21 to the comparator circuit 13. Comparator circuit 13 is of the type described more fully on page 428 of the reference textbook Electronic Analogue Computers by G. A. Korn and T. M. Korn published by the McGraw-Hill Book Company, Inc., second edition, 1956. The comparator 13 essentially comprises a high gain amplifier 22 of conventional construction such as that disclosed in Figure $530_c$ on page 227 of the above identified reference textbook by Korn and Korn. In the feedback circuit of the high gain amplifier 22 are a series connected diode rectifier 23 and biasing battery 24 connected in parallel with a second series connected diode rectifier 25 and biasing battery 26 which are connected in opposite polarity with respect to the first diode rectifier 23 and its biasing battery 24. By this arrangement, upon a switching signal $e_c$ being supplied through the input terminal 12 to high gain amplifier 22, an output switching potential designated $e_c'$ will appear at the output of the high gain amplifier 22. If the output switching signal $e_c'$ is negative in polarity it will cause the diode rectifier 25 to become conductive thereby clamping the output of the amplifier 22 to the negative potential of the biasing battery 26. Conversely, if the output switching potential $e_c'$ is positive in polarity, it will cause the diode 23 to be rendered conductive thereby clamping the output of the high gain amplifier 22 to the positive potential of the biasing battery 24. The biasing batteries 24 and 26 may be of unequal magnitude but for symmetry of operation they are usually of equal potential and opposite in polarity. If the biasing batteries 24 and 26 are of equal voltage but opposite polarity the result is to produce a square wave switching signal at the output of the comparator 13 having either a positive or negative value which is constant in magnitude.

The square wave switching potential $e_c'$ is then applied over one path comprised by the summation device 14 and gating device 17 to the second summation device 16. The first summation device 14 comprises a high gain amplifier 27 similar in construction to the high gain amplifier 22 and having one input circuit formed by one-half megohm resistor 28 that is connected to the output of the high gain amplifier 22 of comparator 13. A second input circuit for the high gain amplifier 27 is formed by a two and one half megohm resistor 29 which is connected to the terminal 11 to which the information signal to be switched is supplied. A first unidirectional conducting device formed by a diode rectifier 31 is connected in the feedback circuit of the high gain amplifier 27 to clamp it to zero under the proper polarity of output switching signal $e_0'$. A second unidirectional conducting device comprised by a diode rectifier 32 is connected in series circuit relationship with a feedback resistor 33 across the high gain amplifier 27; however, the polarity of the diode rectifier 32 is opposite to the polarity of the diode rectifier 31. An output signal is obtained from the summation and gating device thus formed from the juncture of the diode rectifier 32 and the feedback resistor 33. This juncture is connected through a one megohm resistor to one input circuit of a second summation device 16. The second summation device 16 is formed by a high gain amplifier 34 which is identical in construction to the high gain amplifiers 22 and 27, and which has a feedback resistor 35 formed by a 2.5 megohm resistor connected between the output circuit and the input circuits thereof. The high gain amplifier 34 has a first input circuit formed by a one megohm resistor 36 connected to the juncture of the diode rectifier 32 and the feedback resistor 33, and has a second input circuit formed by a half megohm resistor 37. The second input circuit formed by resistor 37 is connected back to the output of the comparator circuit 13 through a suitable gating diode 38 and clamping diode 39. The gating diode 38 serves to gate the output switching signal $e_c'$ to the input resistor 37 of the high gain amplifier 34 when the proper polarity signal is applied to its input, and the clamping diode 39 serves to clamp to ground the input circuit of high gain amplifier 34 for output switching signal potentials of the reverse polarity. The information signal being switched by the electronic switch thus comprised may be obtained from the output terminal 19 connected to the output high gain amplifier 34.

For proper operation it is essential that for the maximum limit of the information signal $E_s$, the input impedance values of the input resistors 28 and 29 to the high gain amplifier 27 and the value of the switching signal $e_c'$ must be so apportioned that the switching signal magnitude always controls the polarity of the output potention $e_o-'$ at the output of the second high gain amplifier 27. This precaution assures that the switching signal $E_c$ will then indeed control the operation of the electronic switch in the following manner. The values of the resistors 28 and 29 are so apportioned that the two signals $e_s$ and $e_c'$ amplified and summed together in high gain amplifier 27 will produce an output signal $e_o-'$ whose polarity will be determined by the polarity of the input switching signal $e_c'$. As a consequence if the polarity of the output signal $e_o-'$ is positive, then the feedback diode rectifier 31 will be rendered conductive and will essentially clamp high gain amplifier 27 to ground. In this eventuality, no output signal will be obtained from the output of the electronic switch. However, should the polarity of the output signal $e_o-'$ be negative, then the diode rectifier 32 will be rendered conductive, and an output potential will be developed across the feedback resistor 33 which will then allow the high gain amplifier 27 to function as an amplifier. In this eventuality since the forward resistance of the diode rectifier 32 is substantially zero the input of the second summation circuit formed by resistor 36 is effectively coupled directly to the output of the high gain amplifier 27. Concurrently, the output switching signal $e_c'$ appearing at the output of the first high gain amplifier 22 is applied through the gating diode across input resistor 37 to the high gain amplifier 34. It should be noted that the value of the switching signal component applied across the input resistor 37 to the second summation device formed by high gain amplifier 34 is opposite in polarity to the value of the switching signal component applied across the input resistor 36 by reason of the inversion produced by high gain amplifier 27 so that these two components will effectively cancel out in the high gain amplifier 16. The information signal component however will be transmitted through the high gain amplifier 34 and will appear at its output terminal 19 for use in the circuit to which the electronic switch is connected. Should it be desired, the values of the input impedances of the high gain amplifiers 27 and 34 may be proportioned to provide a gain through the electronic switch. However, for the values of the parameters indicated in the drawings, no gain occurs and the output potential $e_0$ appearing across the output terminal 19 will be equal to the value of the information signal $e_s$ applied to the input terminals 11. The following set of equations is believed to depict the operation of the circuit shown in Figure 2 of the drawings.

$$e_c' = \pm 25 \text{ v. where the sign } [e_c'] = -\text{sign } [e_c] \quad (1)$$

$$e_0 = -\frac{1}{\frac{1}{2}} e_c' - \frac{1}{2.5}$$

$$= -2e_c' - .4e_s$$

$$e_0 = -2.5e_0^{-\prime} - \frac{2.5}{\frac{1}{2}} e_c'$$

$$= 5e_c' + e_s - 5e_c'$$

$$= e_s$$

From an examination of the foregoing expressions it can be appreciated that only the information signal $e_s$ is applied at the output of the electronic switch. Because the switch is fabricated from conventional parts, it is simple to manufacture and can be constructed at a relatively low cost. Further, since it is all electrically operated, the switching speeds at which the circuit may be designed to operate may be readily adjusted to suit any particular application by proper fabrication techniques well known in the art. Since there are no mechanically moving parts, there is no wear and tear involved which would result in production of arcing and undesired transients produced thereby, and the operating life of the switch is quite considerable in comparison to its electromechanical counterparts.

Figure 3:
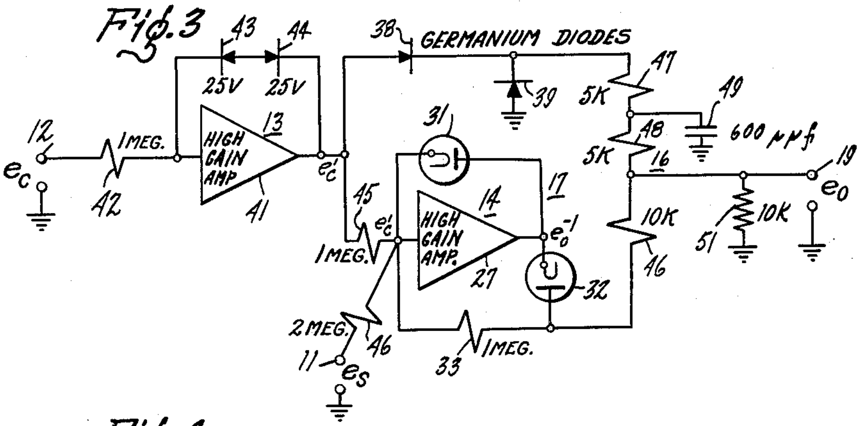
Figure 3 is a schematic circuit diagram of still a different form of electronic switch constructed in accordance with the invention.

A second embodiment of a working circuit arrangement for an electronic switch constructed in accordance with the invention is illustrated in Figure 3 of the drawings. This electronic switch includes a comparator circuit 13 formed by a high gain amplifier 41 having its input connected to the source of switching signals 12 through an input resistor 42. In the feedback circuit of the high gain amplifier 41 are a pair of Zener diodes 43 and 44 which are connected back to back. The Zener diodes 43 and 44 exhibit the characteristic of possessing high resistance to current flow up to a particular voltage value, and thereafter breaking down in the reverse direction to exhibit substantially zero resistance to additional current flow. For a more detailed description of Zener diodes and their method of operation, reference is made to the description appearing on page 168 of the reference text entitled, "An Introduction to Semiconductors" by W. Crawford Dunlap, Jr., published by John Wiley & Sons, 1957. The particular diodes 43 and 44 are designed to break down at a voltage of 25 volts. As a consequence of this construction, upon the switching signal being applied to high gain amplifier 41 reaching a value in the neighborhood of 25 volts at the output of the high gain amplifier 41, the Zener diodes 43 and 44 will break down and clamp the output of the amplifier to this potential thereby producing a square wave output potential $e_c'$ that is applied over two conductive paths to the second summation device 16. One of the conductive paths comprises a first summation device formed by high gain amplifier 27 of conventional construction such as described in the above identified reference text by Korn and Korn. In the feedback circuit of the high gain amplifier 27 is a first diode rectifier 31 which when rendered conductive effectively clamps the high gain amplifier 27 to zero. High gain amplifier 27 also has its output connected to a diode rectifier 32 which is connected in series circuit relationship with a feedback impedance 33 between the output and the input of the high gain amplifier 27. The switching signal defined by the comparator circuit 13 is applied to one input of high gain amplifier 27 across a one meg-ohn resistor 45, and the information signal to be switched supplied from the input terminals 11 is applied across an input resistor 46 to the remaining input terminal of high gain amplifier 27. The high gain amplifier 27 then functions in an identical manner to the summation and gating circuits 14 and 17 described with relation to the species of the invention shown in Figure 2, to produce an output potential $e_0^{-\prime}$ at its output. If this potential is positive, no signal voltage $e_s$ will get through the switch. However if the output potential $e_0^{-\prime}$ is negative, it will appear at the juncture of the diode 32 and feedback resistor 33, and is supplied to one of the inputs of summation circuit 16.

The summation circuit 16 comprises a passive resistance summing network formed by a 10 kilohm resistor 46 and a pair of five kilohm resistors 47 and 48 whose junction is connected to ground by a 600 micro microfarad capacitor 49. Capacitor 49 is used to produce a lagging characteristic which is equal to the lagging characteristic inherent in amplifier 27. This serves to remove the switching spike-like pulse that would otherwise occur upon signal switching. The output potential derived by the passive resistance summing network is developed across a 10 kilohm load resistor 51 and applied to the output terminals 19 for use by the circuit connected to the electronic switch. Input signals are supplied to the passive resistance summing network from the juncture of the diode 32 and feedback resistor 33 through the resistor 46. The remaining input of summing network 16 formed by resistors 47 and 48 is connected to the output of the comparator 14 through a gating diode 38 and clamping diode 39.

By reason of the above construction it can be appreciated that two parallel paths are supplied for the switching potentials $e_c'$ applied from the source of switching signals to input terminal 12. These switching signals are first shaped by the wave shaping circuit formed by high gain amplifier 41 and the two Zener diodes 43 and 44. As explained more fully in the above identified reference text by Dunlap the Zener diodes 43 and 44 exhibit the characteristic of having an inverse breakdown voltage at some predetermined value wherein the diode breaks down and conducts in reverse direction. Upon this occurrence, current through the diodes will then be of a value sufficient to maintain the potential $e_c'$ at the breakdown potential of the diode which in the specific example of Figure 3 is in the neighborhood of 25 volts. If the switching potential supplied from terminal 12 is negative in polarity the high gain amplifier and Zener diodes 43 and 44 will function to produce a square wave positive going potential at the output which potential is applied to the gating diode 38, and across the input resistor 45 to high gain amplifier 27. At this point the switching signal will be positive in polarity, and hence will produce a negative going potential $e_0^{-\prime}$ at the output of the high gain amplifier 27. This potential will then render the diode 32 conductive which will connect in the feedback resistor 33 so that the high gain amplifier 27 functions as a DC amplifier to produce the output potential $e_0^{-\prime}$. This output potential contains both switching signal components and the information signal components, and is applied across the summing resistor 46 of the passive resistive summong network. The switching potential component $e_c'$ is also applied through the gating diode 38 which is rendered conductive during the positive polarity portions of the switching voltage and is applied across the two summing resistors 47 and 48 of the passive resistive summing network. It can be appreciated that the potentials developed across resistors 47 and 48 are in opposition to the potentials developed across the summing resistor 46 so that the switching potential components are cancelled out, and only the information signal component appears across the load resistor 51. This information signal component is then supplied from the output terminal 19 to the circuit being used in conjunction with the electronic switch. During the positive going half cycles of the input switching signal $e_c$, the gating diode 38 is blocked, and simultaneously the feedback diode 31 is rendered conductive so as to render high gain amplifier 27 ineffective, thereby effectively cutting off all signals from the output terminal 19. The following set of equations shows the relative values of the switching potential and the information signal potential component at the output of the various stages of the switch. It is to be understood, however, that these values are only for the particular parameters illustrated in the Figure 3 of the drawings, and that if desired, other operating characteristics can be obtained by proper selection of the parameters of the circuit.

$$e_c' = \pm 25 \text{ v. where sign } [e_c'] = -\text{sign } [e_c] \qquad (2)$$

$$e_0^{-\prime} = -e_c' - \frac{1}{2} e_s$$

$$e_0 = \frac{5}{5+10} e_0^{-\prime} + \frac{5}{5+10} e_c^{-\prime}$$

$$= -1/3 e_c' - 1/6 e_s + 1/3 e_c'$$

$$= 1/6 e_s$$

Figure 4:
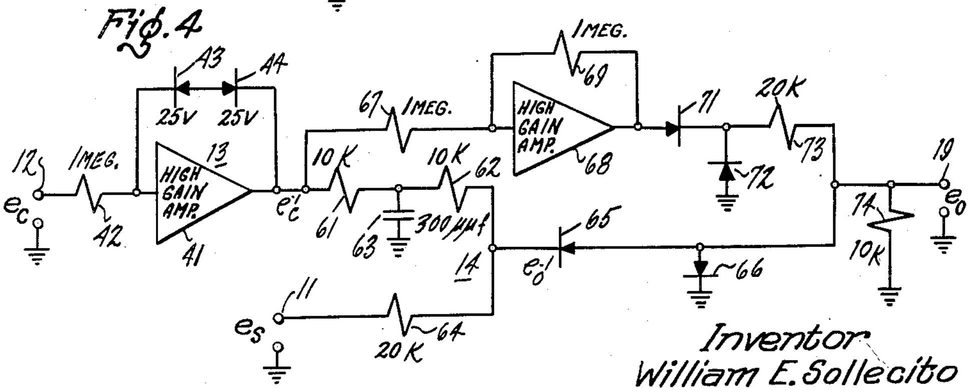
Figure 4 is a schematic circuit diagram of still a third form of electronic switch constructed in accordance with the invention.

Still a third embodiment of the invention is illustrated in Figure 4 of the drawings. The electronic switch shown in Figure 4 includes a comparator stage 13 formed by a high gain amplifier 41 with a pair of back to back connected Zener diodes 43 and 44 in the feedback circuit. The high gain amplifier 41 is connected through a one meg-ohm input resistor 42 to the input terminal 12 to which the switching signals $e_c$ are applied. The comparator formed by high gain amplifier 41 and Zener diodes 43 and 44 functions in the manner described with relation to the species of invention shown in Figure 3 to develop a square wave output potential whose polarity and frequency is dependent upon the polarity and frequency of the switching signal supplied by input terminal 12.

The switching signal $e_c'$ developed at the output of comparator circuit 13 is supplied to a summation circuit that may be said to be comprised of three inputs connected together in two stages. The first stage consists of one input formed by a pair of resistors 61 and 62 whose juncture is coupled to ground by a capacitor 63 and a second input formed by a resistor 64 connected to the input terminal 11 of the information signal to be switched. The juncture of the resistor 64 and resistor 62 is connected through a gating diode 65 across a clamping diode 66 to a summing load resistor 74. As a consequence of this connection, both switching signal and information signal components are supplied across summing resistor 74. A second switching signal component $e_c'$ is also supplied to summing resistor 74 over a separate path formed by a one meg-ohm resistor 67 connected to the input of a high gain amplifier 68. The high gain amplifier 68 has its output connected to summing resistor 74 through a gating diode 71 across a clamping diode 72, and a resistor 73 which form the second stage of the summation circuit.

As a result of the above construction square wave switching potential $e_c'$ developed by the comparator circuit 13 is supplied across resistors 61 and 62, and through the high gain amplifier 68 which acts as an inverting device, to the summing resistor 74. The information signal to be switched is applied across only the resistor 64 through gating diode 65 to the summing resistor 74. The values of the switching signal $e_c'$, and the information signal $e_s$, and the value of the resistors 61, 62, 64 of the passive resistor summing network are so apportioned that the polarity of the potential applied to the gating diode 65 is always determined by the polarity of the switching potential $e_c'$. Accordingly, during the positive half cycles of the switching potential $e_c'$, the gating diode 65 will remain nonconductive so that the composite signal $e_0^{-\prime}$ is not applied to the summing resistor 74. During the negative half cycles of the switching potential $e_c'$, however, gating device 65 is rendered conductive so that in effect the resistors 61, 62 and 64 are connected directly as an input arm to the summing resistor 74. It can be appreciated however that by reason of the inversion occurring in the high gain amplifier 68, the switching signal components $e_c'$ developed across the output resistor 74 will be 180 degrees out of phase with the switching signal components $e_c'$ connected through the gating diode 65. Accordingly, the switching signal components $e_c'$ will be cancelled out, and only the information signal component $e_s$ will appear across the output summing resistor 74. This information signal component may then be obtained from the output terminal 19.

The following set of expressions depicts the mode of operation of the electronic switch shown in Figure 4 for the parameters cited.

$$e_c' = \pm 25 \text{ v. sign } (e_c') = -\text{sign } (e_c) \qquad (3)$$

$$e_0 = \left[\frac{e_s}{20} + \frac{e_c'}{20} + \left(\frac{-e_c'}{20}\right)\right] \frac{1}{\frac{1}{20} + \frac{1}{20} + \frac{1}{20} \div \frac{1}{10}}$$

$$= e_{s/5}$$

From the foregoing description and equations it can be appreciated that the invention provides a new and improved electronically operable switch which may be used in a wide number of applications. The switch is capable of operating at a relatively fast rate and does not introduce unwanted extraneous switching transients into the information signal being switched. Further, the switch is comparatively simple in construction and inexpensive to manufacture and can be readily modified to improve its operating characteristics to accommodate any desired switching rate.

Having described several embodiments of a new and improved electronic switch constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. An electronic switch including in combination a comparator circuit for shaping the wavefront of an electric switching signal, an amplifying device having one input terminal operatively coupled to the output of said comparator and a remaining input terminal coupled to a source of signals to be switched, a unidirectional conducting device connected across said amplifying device for by-passing said amplifying device, a second unidirectional conducting device connected in series circuit relationship with a feedback impedance across said amplifying device, said second unidirectional conducting device being connected in reverse polarity with respect to said first unidirectional conducting device, and a summing device having one input operatively coupled to the output of said comparator and having a second input coupled to the junction of said second unidirectional device and said feedback impedance.

2. An electronic switch including in combination a comparator circuit for shaping the wavefront of an electric switching signal, a high gain amplifying device having one input terminal operatively coupled to the output of said comparator and a remaining terminal coupled to a source of signals to be switched, a diode rectifier connected across said amplifying device for clamping to ground said amplifying device, a second diode rectifier connected in series circuit relationship with a feedback resistor across said amplifying device, said second diode rectifier being connected in reverse polarity with respect to said first diode rectifier, and a summing device having one input operatively coupled to the output of said comparator and having a second input coupled to the junction of said second diode rectifier and said feedback resistor.

3. The combination set forth in claim 2 wherein said summing device comprises a second high gain amplifier.

4. The combination set forth in claim 2 wherein said summing device comprises a passive resistive summing network.

5. An electronic switch including in combination a comparator circuit for shaping the wavefront of an electric switching signal, a high gain amplifying device having one input terminal operatively coupled to the output of said wave shaping device and a remaining input terminal coupled to a source of signals to be switched, the relative values of the amplitudes of said switching signal and the signal to be switched and the proportional values of the input impedances of said input terminals to said amplifying device being such that the amplitude of amplified output switching signal exceeds the value of the information signal to be switched at the output of said amplifying device, a unidirectional conducting device connected across said amplifying device for clamping to ground said amplifying device, a second unidirectional conducting device connected in series circuit relationship with a feedback impedance across said amplifying device, said second unidirectional conducting device being connected in reverse polarity with respect to said first unidirectional conducting device, a summing device having a first input terminal operatively coupled to the output of said comparator circuit and having a second input terminal coupled to the junction of said second unidirectional device and said feedback impedance, and a gating and clamping circuit connected intermediate the output of said comparator circuit and the first input terminal of said summing device.

6. An electronic switch for switching a desired source of signals on and off with respect to an output circuit including in combination, a comparator circuit for shaping the waveform of an applied electric switching signal, a first summing device having one input terminal operatively coupled to the output of said comparator and a second input terminal operatively coupled to a source of signals to be switched, a gating device coupled to the output of said first summing device, an inverting device having an input terminal connected to the output of said comparator, and a second summing device having one input terminal coupled to the output of said gating device and having a second input terminal connected to the output of said inverting device.

7. An electronic switch for switching a desired source of signals on and off with respect to an output circuit including in combination, a comparator wave shaping circuit for shaping the waveform of an applied electric switching signal, a first passive summing network having one input terminal operatively coupled to the output of said comparator and a second input terminal operatively coupled to a source of signals to be switched, a diode gating device coupled to the output of said first summing network, a clamping diode coupled between said gating diode and ground, a high gain amplifier having its input connected to the output of said comparator, and a second passive summing network having one of its input terminals connected to the output of said gating diode across said clamping diode and having a remaining input terminal coupled to the output of said high gain amplifier.

8. An electronic switch for switching a desired source of information signals on and off with respect to an output circuit by means of electric switching signals including in combination, a first summing device having one input terminal operatively coupled to the source of electric switching signals, and a second input terminal operatively coupled to a source of signals to be switched, a gating device coupled to the output of said first summing device, a second summing device having one input terminal coupled to the output of said gating device and having a second input terminal coupled to the input of said first summing device, and an inverting device connected intermediate one of the input terminals of said second summing device and the input of said first summing device.

9. The combination set forth in claim 8 further characterized by a comparator wave shaping circuit for shaping the waveform of the applied switching signal, the comparator circuit having its input connected to the source of switching signals and having its output coupled to the first summing device.

References Cited in the file of this patent

UNITED STATES PATENTS 2,092,496 Branson ---------------- Sept. 7, 1937